United States Patent
Sasaki et al.

(10) Patent No.: US 10,985,409 B2
(45) Date of Patent: Apr. 20, 2021

(54) BATTERY, BATTERY PACK, ELECTRONIC DEVICE, ELECTRICALLY DRIVEN VEHICLE, ELECTRIC STORAGE DEVICE, AND ELECTRIC POWER SYSTEM

(71) Applicant: MURATA MANUFACTURING CO., LTD., Kyoto (JP)

(72) Inventors: Tomoya Sasaki, Kyoto (JP); Makoto Furukawa, Kyoto (JP)

(73) Assignee: Murata Manufacturing Co., Ltd., Tokyo (JP)

( * ) Notice: Subject to any disclaimer, the term of this patent is extended or adjusted under 35 U.S.C. 154(b) by 186 days.

(21) Appl. No.: 16/287,595

(22) Filed: Feb. 27, 2019

(65) Prior Publication Data
US 2019/0198935 A1 Jun. 27, 2019

Related U.S. Application Data

(63) Continuation of application No. PCT/JP2017/023068, filed on Jun. 22, 2017.

(30) Foreign Application Priority Data

Aug. 31, 2016 (JP) ............................. JP2016-169674

(51) Int. Cl.
*H01M 4/02* (2006.01)
*H01M 10/0587* (2010.01)
(Continued)

(52) U.S. Cl.
CPC ....... *H01M 10/0587* (2013.01); *H01M 4/525* (2013.01); *H01M 4/661* (2013.01); *H01M 10/0431* (2013.01); *H01M 10/0525* (2013.01); *H01M 10/425* (2013.01); *H01M 2004/021* (2013.01); *H01M 2004/028* (2013.01); *H01M 2220/20* (2013.01)

(58) Field of Classification Search
CPC ....................................................... H01M 4/02
See application file for complete search history.

(56) References Cited

U.S. PATENT DOCUMENTS

| 2010/0310924 | A1  | 12/2010 | Kaneda et al. |
| 2013/0280579 | A1* | 10/2013 | Wright ................. H01G 9/0029 429/124 |
| 2015/0295216 | A1* | 10/2015 | Okuno ................ H01M 2/1686 320/128 |

FOREIGN PATENT DOCUMENTS

| JP | H08130035 A    |   | 5/1996 |
| JP | 2003-045474    | * | 2/2003 |

(Continued)

OTHER PUBLICATIONS

International Search Report for Application No. PCT/JP2017/023068, dated Aug. 1, 2017.
(Continued)

*Primary Examiner* — Jacob B Marks
(74) *Attorney, Agent, or Firm* — K&L Gates LLP

(57) ABSTRACT

The battery is provided. The battery includes an electrode. The electrode includes a current collector and an active material layer provided on an inside surface of the current collector. The active material layer includes a first region and a second region, where the second region includes an area density lower than the first region, and the second region is provided in a winding-back portion of the active material layer.

18 Claims, 8 Drawing Sheets

(51) Int. Cl.
    *H01M 10/04*     (2006.01)
    *H01M 4/525*     (2010.01)
    *H01M 4/66*     (2006.01)
    *H01M 10/0525*     (2010.01)
    *H01M 10/42*     (2006.01)

(56) References Cited

FOREIGN PATENT DOCUMENTS

| | | |
|---|---|---|
| JP | 2003045474 A | 2/2003 |
| JP | 2010080427 A | 4/2010 |
| JP | 2013171669 A | 9/2013 |
| JP | 2016181443 A | 10/2016 |
| WO | 2014024425 A1 | 2/2014 |
| WO | 2014/024425 | 7/2016 |

OTHER PUBLICATIONS

Japanese Office Action dated Dec. 3, 2019 in corresponding Japanese Application No. 2018-536975.
Japanese Office Action dated Jun. 30, 2020 in corresponding Japanese Application No. 2018-536975.

* cited by examiner

BATTERY, BATTERY PACK, ELECTRONIC DEVICE, ELECTRICALLY DRIVEN VEHICLE, ELECTRIC STORAGE DEVICE, AND ELECTRIC POWER SYSTEM

CROSS REFERENCE TO RELATED APPLICATIONS

The present application is a continuation of PCT patent application no. PCT/JP2017/023068, filed on Jun. 22, 2017, which claims priority to Japanese patent application no. JP2016-169674 filed on Aug. 31, 2016, the entire contents of which are being incorporated herein by reference.

BACKGROUND

The present technology generally relates to a battery including a belt-shaped flat electrode wound element, a battery pack, an electronic device, an electrically driven vehicle, an electric storage device, and an electric power system including the battery.

There is known a wound type battery including an electrode body in which a positive electrode in which a positive electrode active material layer is formed on a positive electrode current collector and a negative electrode in which a negative electrode active material layer is formed on a negative electrode current collector are wound into a flat shape with a separator interposed therebetween. Increasing a capacity of the battery by improving an area density of the active material layer is studied in the wound type battery.

However, when the area density of the active material layer is improved, in winding the positive electrode, the negative electrode, and the separator into the flat shape to produce the electrode body, a crack or a break (hereinafter, referred to as "crack and the like") is easily generated in the positive electrode current collector and the negative electrode current collector at winding-back portions of the positive electrode and the negative electrode. Between the positive electrode and the negative electrode, the crack and the like are particularly easily generated in the positive electrode. In the positive electrode, the crack and the like are particularly easily generated at the first winding-back portion of the positive electrode active material layer provided on an inside surface of the positive electrode current collector.

SUMMARY

The present technology generally relates to a battery including a belt-shaped flat electrode wound element, a battery pack, an electronic device, an electrically driven vehicle, an electric storage device, and an electric power system including the battery.

An object of the present technology is to provide a battery that can prevent the generation of the crack and the like in the electrode, and a battery pack, an electronic device, an electrically driven vehicle, an electric storage device, and an electric power system that include the battery.

According to an embodiment of the present technology, a battery is provided. The battery includes an electrode. The electrode includes a current collector and an active material layer provided on an inside surface of the current collector, the active material layer includes a first region and a second region, wherein the second region includes an area density lower than the first region, and the second region is provided in a winding-back portion of the active material layer.

A battery pack, an electronic device, an electrically driven vehicle, an electric storage device, and an electric power system include the battery according to an embodiment of the present technology.

According to the present technology, the generation of the crack and the like in the electrode can be prevented.

It should be understood that each effect described herein is not necessarily limited and other suitable properties relating to the present technology may be realized and as further described.

DETAILED DESCRIPTION

The present technology generally relates to a battery including a belt-shaped flat electrode wound element, a battery pack, an electronic device, an electrically driven vehicle, an electric storage device, and an electric power system including the battery.

As described herein, the present disclosure will be described based on examples with reference to the drawings, but the present disclosure is not to be considered limited to the examples, and various numerical values and materials in the examples are considered by way of example.

Figure 1:
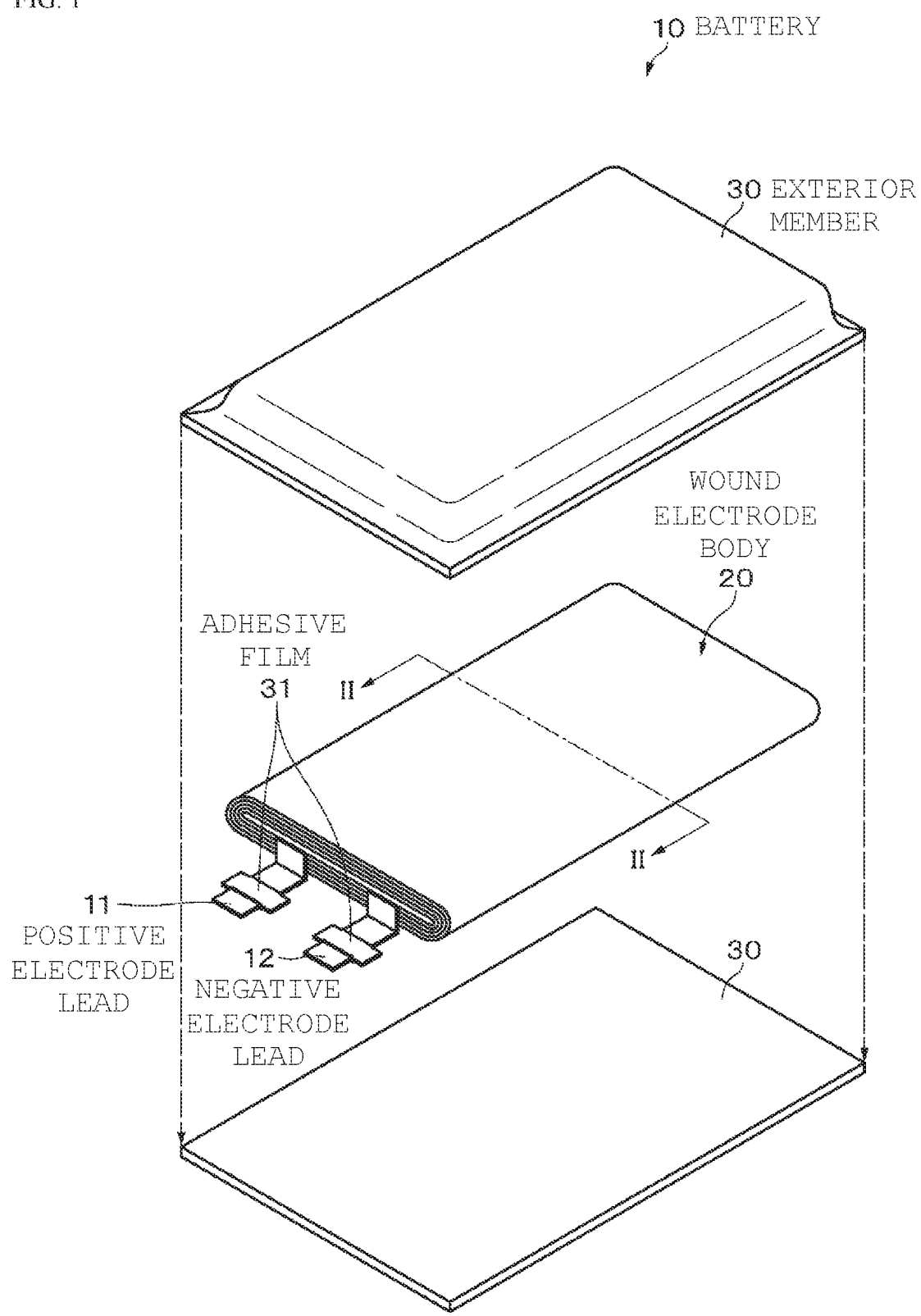
FIG. 1 is an exploded perspective view illustrating an example of a configuration of a battery according to an embodiment of the present technology.

As illustrated in FIG. 1, a nonaqueous electrolyte secondary battery (hereinafter, simply referred to as "battery") 10 according to one embodiment of the present technology is what is called a laminated film type battery, in which a flat wound electrode body 20 to which a positive electrode lead 11 and a negative electrode lead 12 are attached is accommodated in a film-shaped exterior member 30, and miniaturization, weight reduction, and low profile can be achieved in the battery 10.

The positive electrode lead 11 and the negative electrode lead 12 are led outward from an inside of the exterior member 30, for example, in the same direction. Each of the positive electrode lead 11 and the negative electrode lead 12 is made of a metal material such as aluminum (Al), copper (Cu), nickel (Ni), and stainless steel, and has a thin plate shape or a mesh shape.

For example, the exterior member 30 is constructed with a flexible laminate film. For example, the exterior member 30 has a configuration in which a thermally fusible resin layer, a metal layer, and a surface protective layer are sequentially laminated. A surface on a side of the thermally fusible resin layer constitutes a surface on a side where the wound electrode body 20 is accommodated. Examples of materials for the thermally fusible resin layer include polypropylene (PP) and polyethylene (PE). For example, aluminum can be cited as the material for the metal layer. For example, nylon (Ny) can be cited as the material for the surface protective layer. Specifically, for example, the exterior member 30 is constructed with a rectangular aluminum laminated film obtained by bonding a nylon film, an aluminum foil, and a polyethylene film in this order. For example, the exterior member 30 is disposed such that the thermally fusible resin layer side and the wound electrode body 20 are opposed to each other, and outer edges adhere to each other by fusion or a bonding agent. An adhesive film 31 is inserted between the exterior member 30 and the positive electrode lead 11 and the negative electrode lead 12 in order to prevent invasion of outside air. The adhesive film 31 is made of a material having adhesiveness to the positive electrode lead 11 and the negative electrode lead 12, for example, a polyolefin resin such as polyethylene, polypropylene, modified polyethylene, and modified polypropylene.

Instead of the laminated film, the exterior member 30 may be constructed with a laminated film having another structure, a polymer film such as polypropylene, or a metal film. Alternatively, a laminated film in which a polymer film is laminated on one side or both sides of an aluminum film as a core material may be used.

The exterior member 30 further including a colored layer and/or the exterior member 30 containing a colored material in at least one layer selected from the thermally fusible resin layer and the surface protective layer may be used from the viewpoint of beautiful appearance. In the case that the bonding layer is provided at least one of between the thermally fusible resin layer and the metal layer and between the surface protective layer and the metal layer, the bonding layer may contain the colored material.

Figure 2:
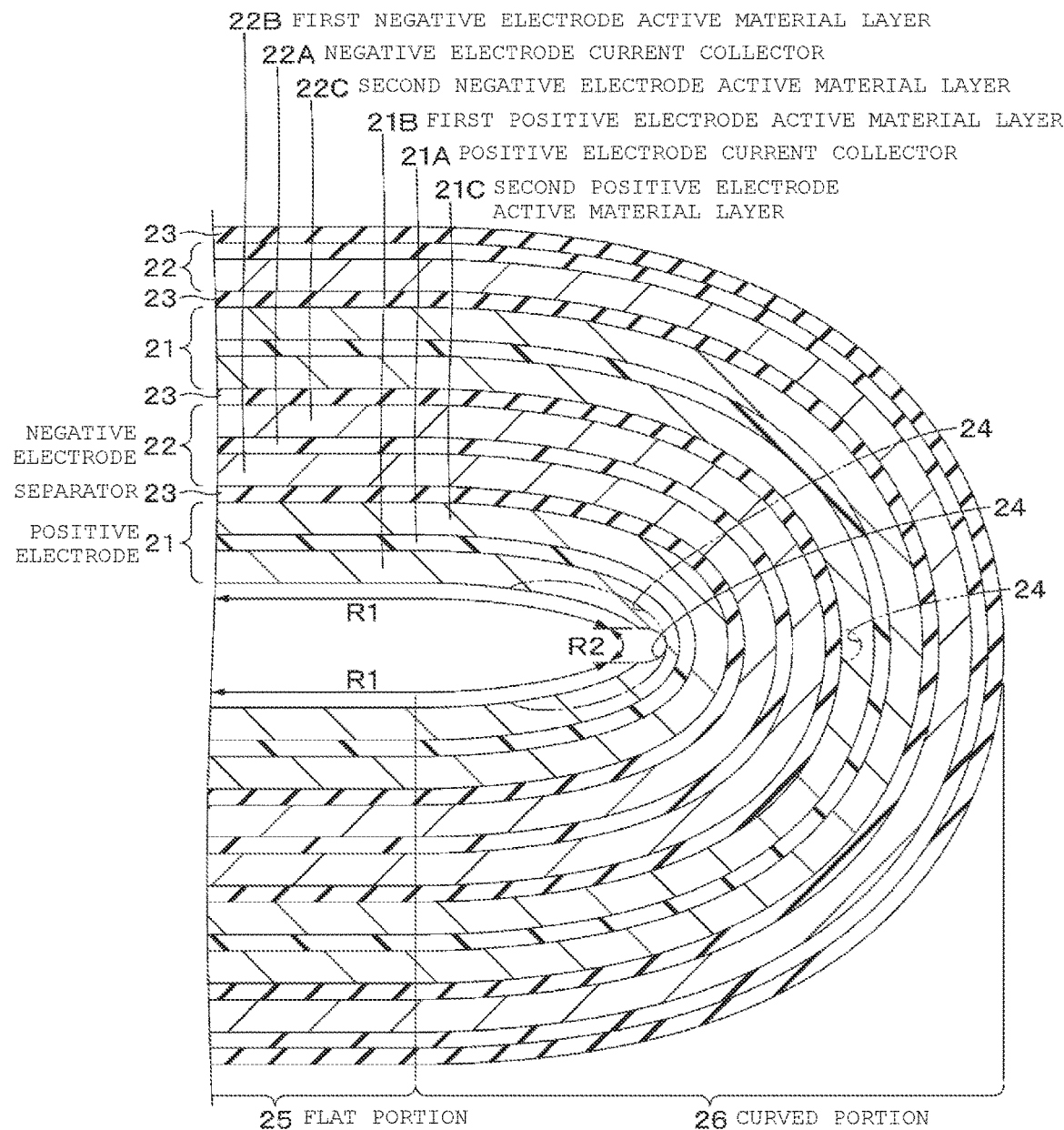
FIG. 2 is a sectional view taken along a line II-II in FIG. 1.

As illustrated in FIG. 2, the positive electrode 21 and the negative electrode 22 having an elongated shape (belt shape) are laminated with a separator 23 having the elongated shape (belt shape) interposed therebetween, and the wound electrode body 20 as a battery element is wound in a flat and spiral shape. Typically, the positive electrode 21 and the negative electrode 22 wound in the flat shape include a flat portion 25 and a curved portion 26. An electrolytic solution as an electrolyte is injected into the exterior member 30, and impregnated in the positive electrode 21, the negative electrode 22, and the separator 23. Although FIG. 2 illustrates the wound electrode body 20 in which the positive electrode 21 constitutes the innermost peripheral electrode while the negative electrode 22 constitutes the outermost peripheral electrode, the wound electrode body 20 may be wound such that the negative electrode 22 may constitute the innermost peripheral electrode while the positive electrode 21 constitutes the outermost peripheral electrode. An outermost peripheral end of the negative electrode 22 is fixed by a winding-stop tape (not illustrated).

The positive electrode 21, the negative electrode 22, the separator 23, and the electrolytic solution constituting the battery will sequentially be described below.

As illustrated in FIG. 2, the positive electrode 21 includes a positive electrode current collector 21A, a first positive electrode active material layer 21B provided on an inside surface of the positive electrode current collector 21A, and a second positive electrode active material layer 21C provided on an outside surface of the positive electrode current collector 21A. As used herein, the "inside" and "outside" mean the inside and the outside in the positive electrode current collector 21A in the wound state. On an innermost periphery, the positive electrode 21 includes a positive electrode current collector exposed portion (not illustrated) in which both surfaces of the positive electrode current collector 21A are exposed without being covered with the first and second positive electrode active material layers 21B, 21C. The positive electrode lead 11 is connected to the positive electrode current collector exposed portion.

The positive electrode current collector 21A contains a metal material such as aluminum, aluminum alloy, nickel, and stainless steel, and preferably contains aluminum or aluminum alloy among these metals. For example, a foil shape, a plate shape, or a mesh shape can be used as the shape of the positive electrode current collector 21A.

A thickness of the positive electrode current collector 21A ranges preferably from 5 μm to 20 μm, and more preferably from 8 μm to 15 μm. When the thickness is less than 5 μm, although the thickness of the first and second positive electrode active material layers 21B, 21C can further be thickened, there is a possibility of a crack in the positive electrode 21 in the pressing process because the positive electrode current collector 21A is too thin. Additionally, there is a possibility of generating the crack in the positive electrode 21 after winding. The thickness of the positive electrode current collector 21A is a value measured with a micrometer.

Figure 3A:
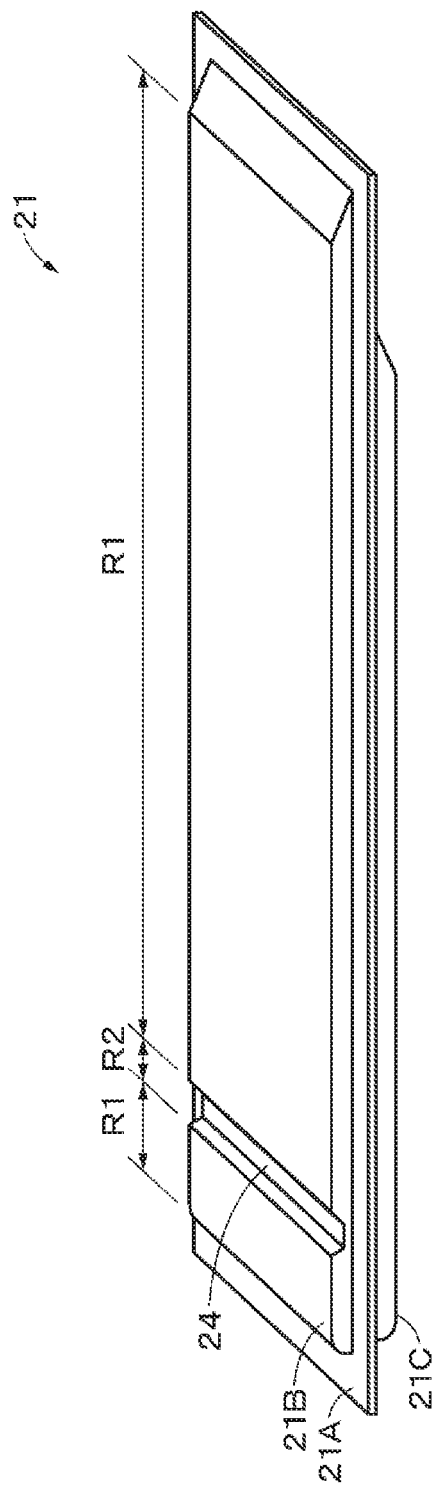
FIG. 3A is a perspective view illustrating an example of a configuration of a positive electrode according to an embodiment of the present technology.

As illustrated in FIG. 3A, the first positive electrode active material layer 21B includes a first region R1 and a second region R2 having an area density lower than that of the first region R1. The first and second regions R1, R2 are provided side by side in a longitudinal direction of the positive electrode 21. Although the configuration in which the first positive electrode active material layer 21B includes only one second region R2 is illustrated in FIG. 3A, the first positive electrode active material layer 21B may include at least two second regions R2.

The first region R1 extends while maintaining a uniform width in a width direction (crosswise direction) of the positive electrode 21, and is continuously provided from one long side to the other long side of the positive electrode 21. While the positive electrode 21 is wound, the second region R2 is provided in a winding-back portion of the first positive electrode active material layer 21B as illustrated in FIG. 2. Because stress tends to concentrate on the winding-back portion of the first positive electrode active material layer 21B, there is a possibility that the positive electrode 21 is easily broken unless the second region R2 is provided.

As described later, the thickness of the second region R2 is typically thinner than the thickness of the first region R1, so that whether the first positive electrode active material layer 21B includes the second region R2 can be checked as follows. The battery is completely discharged, disassembled to take out the positive electrode 21, and placed in a flat state. At this point, the thickness of a portion of the first positive electrode active material layer 21B corresponding to the winding-back portion of the wound electrode body 20 and the thickness of a portion of the first positive electrode active material layer 21B corresponding to the flat portion 25 of the wound electrode body 20 are measured with a shape measuring device (for example, a laser displacement meter), a scanning electron microscope (SEM), or the like. Subsequently, whether the first positive electrode active material layer 21B includes the second region R2 can be checked by checking whether there is a difference between both the measured thicknesses.

The winding-back portion where the second region R2 is provided is preferably the first winding-back portion of the innermost periphery of the first positive electrode active material layer 21B, more preferably both the winding-back portions of the innermost periphery of the first positive electrode active material layer 21B. This is because the stress concentrates particularly on the first winding-back portion of the innermost periphery of the first positive electrode active material layer 21B, therefore, there is a possibility that the positive electrode 21 is particularly easily broken unless the second region R2 is provided. Additional reason is that the stress concentrates easily on the second winding-back portion of the innermost periphery of the first positive electrode active material layer 21B next to the first winding-back portion of the innermost periphery of the first positive electrode active material layer 21B, therefore, there is a possibility that the positive electrode 21 is easily broken unless the second region R2 is provided.

As illustrated by a two-dot chain line in FIG. 2, in addition to the winding-back portion of the innermost periphery (first turn) of the first positive electrode active material layer 21B, preferably the second region R2 is further provided in the second-turn winding-back portion of the innermost periphery of the first positive electrode active material layer 21B. This is because the stress concentrates easily on the second-turn winding-back portion of the first positive electrode active material layer 21B next to the winding-back portion of the innermost periphery of the first positive electrode active material layer 21B, therefore, there is a possibility that the positive electrode 21 is easily broken unless the second region R2 is provided.

As used herein, the winding-back portion means a top of the curved portion 26 of the first positive electrode active material layer 21B wound in a flat shape and a spiral shape, and means a folded portion in the case that the first positive electrode active material layer 21B is wound back so as to be folded.

As illustrated by a solid line in FIG. 2, the second region R2 may locally be provided in the winding-back portion of the first positive electrode active material layer 21B, or the second region R2 may be provided so as to spread to the outside of the winding-back portion of the first positive electrode active material layer 21B as indicated by a two-dot chain line in FIG. 2. However, in consideration of winding misalignment generated in a typical battery winding machine, the second region R2 is preferably provided so as to spread to the outside of the winding-back portion of the first positive electrode active material layer 21B.

The second region R2 may spread to the outside of the winding-back portion of the first positive electrode active material layer 21B and be provided within a range of the curved portion 26, or the second region R2 may be provided to the outside of the curved portion 26. From the viewpoint of preventing a decrease in battery capacity, preferably the first positive electrode active material layer 21B extends to the outside of the winding-back portion and is provided within the range of the curved portion 26.

Figure 3B:
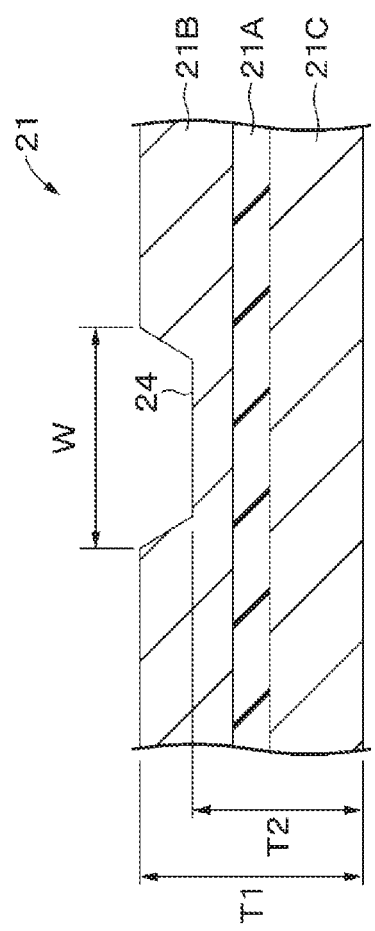
FIG. 3B is a sectional view illustrating an example of a configuration of a recess according to an embodiment of the present technology.

As illustrated in FIGS. 3A and 3B, the thickness of the second region R2 is thinner than the thickness of the first region R1. More specifically, the second region R2 constitutes the recess 24 recessed from the first region R1. The recess 24 extends while maintaining a uniform width in the width direction of the positive electrode 21, and are continuously provided from one long side to the other long side of the positive electrode 21. The recess 24 preferably has a flat or curved bottom surface. This is because if the recess 24 does not have the bottom surface (specifically, for example, when the recess 24 has a V-shaped section), in winding the positive electrode 21, there is a risk that the side surfaces of the recess 24 hit against each other to peel off or drop the first positive electrode active material layer 21B.

Specific sectional shapes of the recess 24 include a trapezoidal shape, a polygonal shape having a quadrangular shape or more, a partially circular shape, a partially elliptical shape, and an irregular shape. However, the present invention is not limited these shapes. At this point, the sectional shape of the recess 24 is a sectional shape of the recess 24 when the positive electrode 21 is cut in a direction perpendicular to the width direction of the positive electrode 21 after completely discharging the battery, dismantling it, taking out the positive electrode 21, and flattening it.

Preferably the recess 24 is open while the positive electrode 21 is wound according to an embodiment of the present technology. This is because, when the recess 24 is closed in winding the positive electrode 21, there is a risk that the side surfaces of the recess 24 hit each other to peel off or drop the first positive electrode active material layer 21B.

A width W of the second region R2 in the longitudinal direction of the positive electrode 21 ranges preferably from 1 mm to 20 mm, more preferably from 5 mm to 20 mm, still more preferably from 10 mm to 20 mm, most preferably from 15 mm to 18 mm. When the width W of the second region R2 is greater than or equal to 1 mm, the effect that prevents the generation of the crack and the like can further be improved. When the width W of the second region R2 is greater than or equal to 5 mm, the second region R2 can be located in the winding-back portion even if the winding misalignment is generated when the wound electrode body 20 is produced with a typical battery winding machine. On the other hand, when the width W of the second region R2 is less than or equal to 20 mm, the decrease in battery capacity can be prevented.

The width W of the second region R2 is a value obtained as follows. The battery is completely discharged, dismantled to take out the positive electrode 21, washed using a solvent (such as dimethyl carbonate (DMC)), and dried thoroughly. Subsequently, while the positive electrode 21 is flattened, the width of the second region R2 is measured with the shape measuring device (laser displacement meter). In the case that the side surface of the recess 24 is an inclined surface, a curved surface, or the like, the width W of a widest portion of the recess 24 displaced in the thickness direction of the positive electrode 21 is defined as the width W of the second region R2. For example, in the case that the recess 24 has a trapezoidal shape as illustrated in FIG. 3B, the width W on an opening side of the recess 24 is defined as the width of the second region R2.

From the viewpoint of increasing the capacity, an average area density $D1$ (mg/cm$^2$) of the first positive electrode active material layer 21B in the first region R1 is preferably greater than or equal to 12.5 mg/cm², more preferably greater than or equal to 19.5 mg/cm². When the average areal density D1 (mg/cm²) of the first positive electrode active material layer 21B is increased in this way, a weight of the active material packed in a unit area of the positive electrode 21 is increased, and the positive electrode 21 tends to be hardened. For this reason, unless the second region R2 is provided in the winding-back portion of the first positive electrode active material layer 21B as described above, the crack and the like are particularly easily generated in the winding-back portion of the positive electrode 21 during the production of the wound electrode body 20, and a possibility of losing the function of the battery 10 as the battery becomes particularly high. In the positive electrode 21, the crack or the break is particularly frequently generated in the innermost winding-back portion of the first positive electrode active material layer 21B.

From the viewpoint of reducing the thickness of the battery 10, the average area density D1 (mg/cm²) of the first positive electrode active material layer 21B in the first region R1 is preferably less than or equal to 32.5 mg/cm², more preferably less than or equal to 30 mg/cm².

On the other hand, the average area density of the second positive electrode active material layer 21C in the whole positive electrode 21 is substantially uniform, and is preferably set to a value similar to the average area density D1 of the first positive electrode active material layer 21B in the first region R1.

The average area density D1 of the first positive electrode active material layer 21B in the first region R1 is a value obtained as follows. First, the battery is completely discharged, dismantled to take out the positive electrode 21, washed using a solvent (such as DMC), and sufficiently dried. Subsequently, the first positive electrode active material layer 21B located on the winding outside during the winding is peeled off using a waste impregnated with a solvent (such as N-methylethylpyrrolidone (NMP)), wiped off NMP using alcohol, and dries at room temperature. Consequently, the positive electrode 21 having only the first positive electrode active material layer 21B on the inside surface of the positive electrode current collector 21A is obtained.

Subsequently, a portion corresponding to the first region R1 of the positive electrode 21 obtained as described above is punched out into a circular shape having φ (diameter) of 5 mm, and the mass (mg) (hereinafter referred to as a "mass A1") is measured. Subsequently, a portion, where the first and second positive electrode active material layers 21B, 21C are not provided and both the surfaces of the positive electrode current collector 21A are exposed, is punched in the same manner as described above, and the mass (mg) (hereinafter, referred to as a "mass B") is measured. An area density d1 is calculated by the following equation.

area density $d1(mg/cm^2)=(mass\ A1-mass\ B)\div punching\ area$

The above measurement is performed on ten randomly-selected batteries, and the area densities d1 of the obtained ten batteries are simply averaged (arithmetically averaged) to calculate the average area density D1.

An area density ratio D2/D1 of the average area density D1 of the first region R1 and an average area density D2 of the second region R2 preferably satisfies a relationship of $0<D2/D1\leq 0.9$, more preferably satisfies a relationship of $0<D2/D1\leq 0.8$. When the areal density ratio D2/D1 is less than or equal to 0.9, the generation of the crack and the like can further be prevented in the winding-back portion of the first positive electrode active material layer 21B. When the areal density ratio D2/D1 is zero, the positive electrode current collector 21A is exposed, so that the safety of the battery 10 is degraded.

The area density ratio D2/D1 is a value obtained as follows. First, similarly to the "method of measuring the average area density D1 of the first positive electrode active material layer", the average area density D1 of the first positive electrode active material layer 21B in the first region R1 is obtained. The average area density D2 of the first positive electrode active material layer 21B in the second region R2 is obtained similarly to the "method of measuring the average area density D1 of the first positive electrode active material layer" except that the first positive electrode active material layer 21B in the second region R2 is punched out into the circular shape. However, in the case that the width of the second region R2 is less than or equal to 5 mm (that is, in the case that the first positive electrode active material layer 21B in the second region R2 cannot be punched out into the circular shape of 5 mm), the whole second region R2 is cut out and both the exposed portions of the positive electrode current collector 21A are also punched out into the similar shape to obtain the average areal density D2. Subsequently, the area density ratio D2/D is obtained using the average areal densities D1, D2 obtained as described above.

An average thickness difference ΔT (=T1−T2) (see FIG. 3) between an average thickness T1 of the positive electrode 21 in the first region R1 and an average thickness T2 of the positive electrode 21 in the second region R2 is preferably greater than or equal to 6 μm, more preferably greater than or equal to 9 μm. When the average thickness difference ΔT is greater than or equal to 6 μm, the generation of the crack and the like can further be prevented in the winding-back portion of the first positive electrode active material layer 21B.

The average thickness difference ΔT is a value obtained as follows. First, a thickness t1 of the positive electrode 21 in the first region R1 is measured with a micrometer for ten randomly-selected batteries, the measured values are simply averaged (arithmetically averaged) to calculate the average thickness T1. Subsequently, a thickness t2 of the positive electrode 21 in the second region R2 is measured with the micrometer for ten randomly-selected batteries, and the measured values are simply averaged (arithmetically averaged) to obtain the average thickness T2. The average thickness difference ΔT (=T1−T2) of the positive electrode 21 is obtained using the average thicknesses T1, T2 obtained as described above.

For example, the first and second positive electrode active material layers 21B, 21C contain a positive electrode active material capable of occluding and discharging lithium that is an electrode reactant. The first and second positive electrode active material layers 21B, 21C may further contain additives as necessary. For example, at least one of a conducting agent and a binding agent can be used as the additive.

For example, lithium-containing compounds such as lithium oxide, lithium phosphorus oxide, lithium sulfide, and an interlayer compound containing lithium are suitable for the positive electrode material capable of occluding and discharging lithium, and at least two kinds of the lithium-containing compounds may be mixed and used. A lithium-containing compound containing lithium, a transition metal element, and oxygen (O) is preferably used to increase the energy density. Lithium composite oxide having a layered rock-salt type structure represented by Formula (A), and lithium composite phosphate having an olivine type structure represented by Formula (B) can be cited as an example of the lithium-containing compound containing lithium, the transition metal element, and oxygen (O). More preferably the lithium-containing compound contains at least one member selected from a group consisting of cobalt (Co), nickel, manganese (Mn) and iron (Fe) as the transition metal element. Examples of such the lithium-containing compound include lithium composite oxide having a layered rock-salt type structure represented by Formula (C), Formula (D) or Formula (E), lithium composite oxide having a spinel type structure represented by Formula (F), and lithium composite oxide having an olivine type structure represented by Formula (G). Specifically, $LiNi_{0.50}Co_{0.20}Mn_{0.30}O_2$, $Li_aCo_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), or $Li_eFePO_4$ (e≈1) can be cited.

$$Li_pNi_{(1-q-r)}Mn_qM1_rO_{(2-y)}X_z \qquad (A)$$

(In Formula (A), M1 represents at least one element selected from Group 2 to Group 15 excluding nickel and manganese. X represents at least one element selected from Group 16 elements excluding oxygen and Group 17 element. p, q, y, z are values within ranges of 0≤p≤1.5, 0≤q≤1.0, 0≤r≤1.0, −0.10≤y≤0.20, and 0≤z≤0.2, respectively.)

$$Li_aM2_bPO_4 \qquad (B)$$

(In Formula (B), M2 represents at least one element selected from Group 2 to Group 15. a, b are values within ranges of 0≤a≤2.0 and 0.5≤b≤2.0, respectively.)

$$Li_jMn_{(1-g-h)}Ni_gM3_hO_{(2-j)}F_k \qquad (C)$$

(In Formula (C), M3 represents at least one element selected from a group consisting of cobalt, magnesium (Mg), aluminum, boron (B), titanium (Ti), vanadium (V), chromium (Cr), iron, copper, zinc (Zn), zirconium (Zr), molybdenum (Mo), tin (Sn), calcium (Ca), strontium (Sr) and tungsten (W). f, g, h, j, k are values within ranges of 0.8≤f≤1.2, 0<g<0.5, 0≤h≤0.5, g+h<1, −0.1≤j≤0.2, and 0≤k≤0.1, respectively. A composition of lithium varies depending on charge and discharge states, and the value of f represents the value in a completely discharged state.)

$$Li_mNi_{(1-n)}M4_nO_{(2-p)}F_q \qquad (D)$$

(In Formula (D), M4 represents at least one element selected from a group consisting of cobalt, manganese, magnesium, aluminum, boron, titanium, vanadium, chromium, iron, copper, zinc, molybdenum, tin, calcium, strontium and tungsten. m, n, p, q are values within ranges of 0.8≤m≤1.2, 0.005≤n≤0.5, −0.1≤p≤0.2, and 0≤q≤0.1, respectively. The composition of lithium varies depending on the charge and discharge states, and the value of m represents the value in the completely discharged state.)

$$Li_rCo_{(1-s)}M5_sO_{(2-t)}F_u \qquad (E)$$

(In Formula (E), M5 represents at least one element selected from a group consisting of nickel, manganese, magnesium, aluminum, boron, titanium, vanadium, chromium, iron, copper, zinc, molybdenum, tin, calcium, strontium and tungsten. r, s, t, u are values within ranges of 0.8≤r≤1.2, 0≤s<0.5, −0.1≤t≤0.2, and 0≤u≤0.1, respectively. The composition of lithium varies depending on the charge and discharge states, and the value of r represents the value in the completely discharged state.)

$$Li_vMn_{2-w}M6_wO_xF_y \qquad (F)$$

(In Formula (F), M6 represents at least one element selected from a group consisting of cobalt, nickel, magnesium, aluminum, boron, titanium, vanadium, chromium, iron, copper, zinc, molybdenum, tin, calcium, strontium and tungsten. v, w, x, y are values within ranges of 0.9≤v≤1.1, 0≤w≤0.6, 3.7≤x≤4.1, and 0≤y≤0.1, respectively. The composition of lithium varies depending on the charge and discharge states, and the value of v represents the value in the completely discharged state.)

$$Li_zM7PO_4 \qquad (G)$$

(In Formula (G), M7 represents at least one element selected from a group consisting of cobalt, manganese, iron, nickel, magnesium, aluminum, boron, titanium, vanadium, niobium (Nb), copper, zinc, molybdenum, calcium, strontium, tungsten and zirconium. z is a value within a range of 0.9≤z≤1.1. The composition of lithium varies depending on the charge and discharge states, and the value of z represents the value in the completely discharged state.)

Additionally, inorganic compounds, such as $MnO_2$, $V_2O_5$, $V_6O_{13}$, NiS, and MoS, which do not contain lithium can be cited as the positive electrode material capable of occluding and discharging lithium.

Any material other than those described above may be used as the positive electrode material capable of occluding and discharging lithium. At least two kinds of the above positive electrode materials may be mixed in any combination.

Examples of the binding agent include resin materials such as polyvinylidene fluoride (PVdF), polytetrafluoroethylene (PTFE), polyacrylonitrile (PAN), styrene butadiene rubber (SBR), and carboxymethyl cellulose (CMC), and at least one kind selected from copolymer and the like mainly containing these resin materials.

Carbon materials such as graphite, carbon black, and Ketjen black can be cited as an example of the conducting agent, and one or at least two kinds of these carbon materials are used in mixture as the conductive agent. In addition to the carbon material, a metal material, a conductive polymer material, and the like may be used as long as they have conductivity.

As illustrated in FIG. 2, the negative electrode 22 includes a negative electrode current collector 22A, a first negative electrode active material layer 22B provided on the inside surface of the negative electrode current collector 22A, and a second negative electrode active material layer 22C provided on the outside surface of the negative electrode current collector 22A. The positive electrode 21 and the negative electrode 22 are disposed so that the second positive electrode active material layer 21C and the first negative electrode active material layer 22B are opposed to each other. On the innermost periphery, the negative electrode 22 includes a negative electrode current collector exposed portion (not illustrated) in which both surfaces of the negative electrode current collector 22A are exposed without being covered with the first and second negative electrode active material layers 22B, 22C. The negative electrode lead 12 is connected to the negative electrode current collector exposed portion.

The negative electrode current collector 22A contains metal such as copper, nickel, and stainless steel. For example, a foil shape, a plate shape, or a mesh shape can be used as the shape of the negative electrode current collector 22A.

The first and second negative electrode active material layers 22B, 22C contain at least one kind of negative electrode active materials capable of occluding and discharging lithium. The first and second negative electrode active material layers 22B, 22C may further contain the additive such as the binding agent and the conducting agent as necessary.

In this nonaqueous electrolyte battery, an electrochemical equivalence of the negative electrode 22 or the negative electrode active material is larger than an electrochemical equivalent of the positive electrode 21, and theoretically a lithium metal is not preferably precipitated on the negative electrode 22 during the charging.

Carbon materials such as non-graphitizable carbon, easily graphitizable carbon, graphite, pyrolytic carbons, cokes, glassy carbons, an organic polymer compound fired body, and carbon fibers or activated carbon can be cited as an example of the negative electrode active material. The cokes include pitch coke, needle coke, and petroleum coke. The organic polymer compound fired body is a product obtained by firing and carbonizing a polymer material such as a phenol resin or a furan resin at an proper temperature, and some of the organic polymer compound fired bodies is classified into hardly graphitizable carbon or easily graphitizable carbon. A crystal structure generated during the charging and discharging is slightly changed in these carbon materials, and a high charging and discharging capacity and a good cycle characteristic can be obtained, so that the carbon materials are preferable for the negative electrode active material. In particular, preferably graphite has the large electrochemical equivalent and can obtain the high energy density. Preferably hardly graphitizable carbon obtains the excellent cycle characteristic. The material having a low charging and discharging potential, specifically the material having the charging and discharging potential close to that of the lithium metal is preferred because the material can easily obtain the high energy density of the battery.

A material including at least one of a metal element and a metalloid element as a constituent element (for example, an alloy, a compound, or a mixture) can also be cited as another negative electrode active material capable of increasing the capacity. This is because use of the material can obtain the high energy density. In particular, when the material is used together with a carbon material, more preferably the material can obtain the high energy density and the excellent cycle characteristic. In the present technology, the alloy includes not only the alloy containing at least two kinds of metal elements but also the alloy containing at least one kind of metal elements and at least one kind of metalloid elements. The alloy may contain a non-metallic element. The structure includes a solid solution, an eutectic (eutectic mixture), an intermetallic compound, or a mixture of at least two kinds thereof.

A metal element or a metalloid element capable of forming an alloy with lithium can be cited as an example of the negative electrode active material. Specifically, magnesium, boron, aluminum, titanium, gallium (Ga), indium (In), silicon (Si), germanium (Ge), tin, lead (Pb), bismuth (Bi), cadmium (Cd) Silver (Ag), zinc, hafnium (Hf), zirconium, yttrium (Y), palladium (Pd) or platinum (Pt) can be cited as an example of the negative electrode active material. These elements may be crystalline or amorphous.

A material containing a metal element or a metalloid element of Group 4B in the short period periodic table as a constituent element is preferably used as the negative electrode active material, and more preferably a material contains at least one of silicon and tin as a constituent element. Silicon and tin have a large capability of occluding and discharging lithium, and can obtain the high energy density. Examples of the negative electrode active material include a simple element, an alloy, or a compound of silicon, a simple element, an alloy, or a compound of tin, and a material having at least a part of one or more phases thereof.

A material containing at least one element selected from a group consisting of tin, nickel, copper, iron, cobalt, manganese, zinc, indium, silver, titanium, germanium, bismuth, antimony (Sb), and chromium as a second constituent element except for silicon can be cited as the alloy of silicon. A material containing at least one element selected from a group consisting of silicon, nickel, copper, iron, cobalt, manganese, zinc, indium, silver, titanium, germanium, bismuth, antimony, and chromium as a second constituent element except for tin can be cited as the alloy of tin.

For example, a material containing oxygen or carbon can be cited as an example of the compound of tin or the compound of silicon. The above second constituent element may be contained in addition to tin or silicon.

Among others, a SnCoC-containing material including cobalt, tin, and carbon as the constituent element is preferably used as the Sn-based negative electrode active material. In the SnCoC-containing material, a content of carbon ranges from 9.9 mass % to 29.7 mass %, and a ratio of cobalt to a total of tin and cobalt ranges from 30 mass % to 70 mass %. This is because the high energy density and the excellent cycle characteristic can be obtained in this composition range.

The SnCoC-containing material may further contain another constituent element as necessary. For example, silicon, iron, nickel, chromium, indium, niobium, germanium, titanium, molybdenum, aluminum, phosphorus (P), gallium, or bismuth is preferably used as another constituent element, and at least two kinds of elements may be contained. This is because the capacity or the cycle characteristic can further be improved.

The SnCoC-containing material has a phase containing tin, cobalt, and carbon, and the phase preferably has a low-crystalline or amorphous structure. In the SnCoC-containing material, at least a part of carbon that is the constituent element is preferably bonded to a metal element or a metalloid element that is another constituent element. This is because although it is thought that degradation of the cycle characteristic is caused by aggregation or crystallization of tin and the like, the aggregation or the crystallization can be prevented because carbon can be combined with another element.

For example, X-ray photoelectron spectroscopy (XPS) can be cited as a measurement method for examining a bonding state of the element. In XPS, for graphite, a peak of a 1s orbit (C 1s) of carbon appears at 284.5 eV in a device, which is energy-calibrated such that a peak of a 4f orbital (Au4f) of gold is obtained at 84.0 eV. For surface contaminated carbon, the peak of C1s of carbon appears at 284.8 eV. On the other hand, in the case that a charge density of the carbon element increases, the peak of C1s appears in a region lower than 284.5 eV, for example, when carbon combines with a metal element or a metalloid element. That is, in the case that the peak of a composite wave of C1s obtained for the SnCoC-containing material appears in the region lower than 284.5 eV, at least a part of carbon contained in the SnCoC-containing material combines with the metal element or metalloid element that is another constituent element.

In the XPS measurement, for example, the peak of C1s is used to correct an energy axis of a spectrum. Typically, because the surface contaminated carbon exists on the surface, the peak of C1s of the surface contaminated carbon is set to 284.8 eV, and 284.8 eV is used as an energy reference. In the XPS measurement, a waveform of the peak of C1s is obtained in a form including the peak of the surface contaminated carbon and the peak of carbon in the SnCoC-containing material, so that the peak of the surface contamination carbon and the peak of carbon in the SnCoC-containing material are separated from each other by analysis using, for example, commercially available software. In the analysis of the waveform, a position of a main peak existing on the lowest bound energy side is defined as the energy reference (284.8 eV).

For example, metal oxide or a polymer compound capable of occluding and discharging lithium can also be cited as another negative electrode active material. Examples of the metal oxide include lithium titanium oxide, such as lithium titanate ($Li_4Ti_5O_{12}$), which contains titanium and lithium, iron oxide, ruthenium oxide, and molybdenum oxide. Examples of the polymer compound include polyacetylene, polyaniline, and polypyrrole.

Examples of the binding agent include resin materials such as polyvinylidene fluoride, polytetrafluoroethylene, polyacrylonitrile, styrene butadiene rubber, and carboxymethyl cellulose, and at least one kind selected from copolymer and the like mainly containing these resin materials. The carbon materials and the like similar to those of the first and second positive electrode active material layers 21B, 21C can be used as the conducting agent.

The separator 23 separates the positive electrode 21 and the negative electrode 22, and allows lithium ions to pass while preventing a current short circuit caused by contact between the both electrodes. The separator 23 is constructed with a porous film made of a resin such as polytetrafluoroethylene, polypropylene, and polyethylene, and may have a structure in which at least two kinds of these porous films are laminated. Among others, a polyolefin porous film is preferably used because it is excellent in a short circuit prevention effect and can improve battery safety by a shutdown effect. In particular, because the shutdown effect can be obtained within a range from 100° C. to 160° C. and the electrochemical stability is excellent, polyethylene is preferably used as a material constituting the separator 23. Addition, a material obtained by copolymerizing or blending a resin having chemical stability with polyethylene or polypropylene can be used as the material constituting the separator 23. Alternatively, the porous film may have a structure of at least three layers in which a polypropylene layer, a polyethylene layer, and a polypropylene layer are sequentially laminated.

In the separator 23, a resin layer may be provided on one side or both sides of the porous film that is a base material. The resin layer is a porous matrix resin layer on which an inorganic substance is carried. Consequently, oxidation resistance can be obtained to prevent the degradation of the separator 23. For example, polyvinylidene fluoride, hexafluoropropylene (HFP), polytetrafluoroethylene, and copolymers thereof can be used as the matrix resin.

Metal, a semiconductor, and oxides or nitrides thereof can be cited as the inorganic substance. For example, aluminum, and titanium can be cited as the metal, and silicon and boron can be cited as the semiconductor. A material having substantially no conductivity and a large heat capacity is preferably used as the inorganic substance. This is because when the inorganic substance has the large heat capacity, it is useful for a heat sink at the time of current heating and can further prevent thermal runaway of the battery. Examples of the inorganic substances include oxide or nitride such as alumina ($Al_2O_3$), boehmite (monohydrate of alumina), talc, boron nitride (BN), aluminum nitride (AlN), titanium dioxide ($TiO_2$), and silicon oxide ($SiO_x$). The above inorganic substance may be contained in the porous film that is the base material.

A particle size of the inorganic substance ranges preferably from 1 nm to 10 μm. When the particle size is smaller than 1 nm, the inorganic substance is hardly obtained, and the inorganic substance is not suitable for cost even if it is available. When the particle size is larger than 10 μm, the distance between the electrodes becomes large, so that a filling amount of active material cannot sufficiently be obtained in a limited space and the battery capacity is decreased.

For example, the resin layer can be formed as follows. That is, a slurry composed of the matrix resin, the solvent, and the inorganic substance is coated on the base material (porous film), and the slurry coated base material is caused to pass through a poor solvent of the matrix resin and a solvent affinity bath of the solvent to make phase separation, and dried.

The positive electrode 21, the negative electrode 22, and the separator 23 are impregnated with the electrolytic solution that is a liquid electrolyte. The electrolytic solution contains a solvent and electrolyte salt dissolved in the solvent. The electrolytic solution may contain a known additive in order to improve the battery characteristic.

Cyclic carbonic acid esters such as ethylene carbonate and propylene carbonate can be used as the solvent, and one of the carbonic acid carbonate and the carbonic acid carbonic acid ester, particularly a mixture thereof is preferably used as the solvent. This is because the cycle characteristic can be improved.

In addition to these cyclic carbonic acid esters, a mixture of chain carbonic acid esters such as diethyl carbonate, dimethyl carbonate, ethyl carbonate, and methyl carbonate is preferably used as the solvent. This is because high ionic conductivity can be obtained.

Preferably the solvent further contains 2,4-difluoroanisole or vinylene carbonate. This is because 2,4-difluoroanisole can improve the discharging capacity and vinylene carbonate can improve the cycle characteristic. Thus, when the mixture of 2,4-difluoroanisole and vinylene carbonate is used, preferably the discharging capacity and the cycle characteristic can be improved.

Additionally, butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N, N-dimethylformamide, N-methylpyrrolidinone, N-methyloxazolidinone, N, N-dimethyl imidazolidinone, nitromethane, nitroethane, sulfolane, dimethylsulfoxide, trimethyl phosphate, and the like can be cited as the solvent.

A compound in which at least a part of hydrogen in these nonaqueous solvents is substituted with fluorine may be preferable because sometimes it can improve the reversibility of an electrode reaction depending on a kind of the electrode to be combined.

For example, a lithium salt can be cited as the electrolyte salt, and one type of salt may be used alone, or at least two kinds may be used in mixture. $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiC, difluoro [oxo-lato-O,O'] Lithium borate, lithium bis oxalate borate, and LiBr can be cited as an example of the lithium salt. Among others, preferably $LiPF_6$ can obtain the high ionic conductivity and improve the cycle characteristic.

In the battery 10 having the above configuration, when the charging is performed, for example, lithium ions are discharged from the first and second positive electrode active material layers 21B, 21C, and occluded in the first and second negative electrode active material layers 22B, 22C through the electrolytic solution. When the discharging is performed, for example, the lithium ions are discharged from the first and second negative electrode active material layers 22B, 22C, and occluded in the first and second positive electrode active material layers 21B, 21C through the electrolytic solution.

Figure 4A:
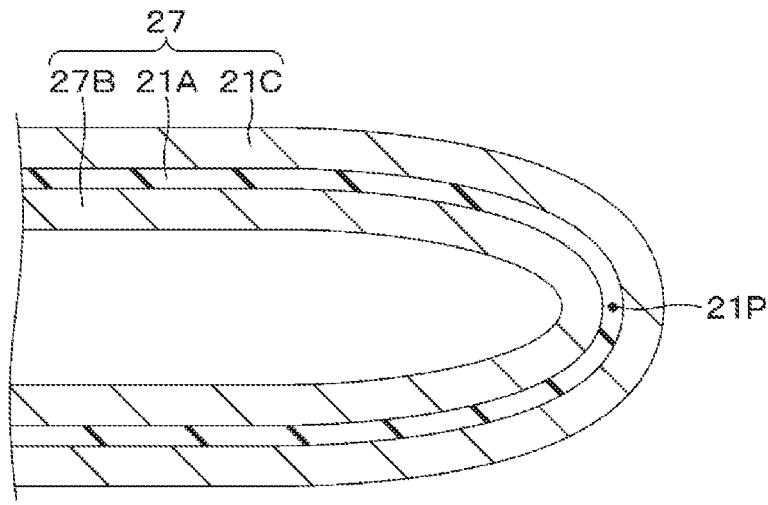
FIG. 4A is a sectional view illustrating stress acting on a winding-back portion of the positive electrode not including the recess.

The stress acting on the positive electrode 27, in which the first positive electrode active material layer 27B not having the recess 24 is provided, during the winding will be described with reference to FIG. 4A. In a flat state of the positive electrode 21 (in the state in which no stress acts on the positive electrode 21), a neutral point is located at a center point 21P of the positive electrode 21. On the other hand, in the state in which the positive electrode 27 is wound back, while the first positive electrode active material layer 27B undergoes compressive stress at the winding-back portion of the positive electrode 21, the second positive electrode active material layer 21C provided on the outer peripheral surface of the positive electrode current collector 21A undergoes tensile stress at the winding-back portion of the positive electrode 21. In this state, the neutral point moves to the inside of the center point 21P of the positive electrode 21, so that the tensile stress acts on the positive electrode current collector 21A. Depending on the magnitude of this stress, sometimes the crack and the like are generated in the positive electrode current collector 21A.

Figure 4B:
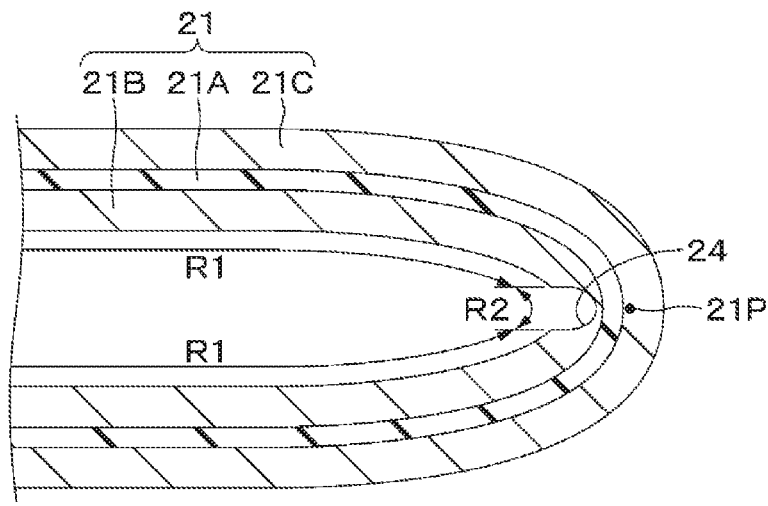
FIG. 4B is a sectional view illustrating the stress acting on the winding-back portion of the positive electrode including the recess according to an embodiment of the present technology.

The stress acting on the positive electrode 21 provided with the first positive electrode active material layer 21B including the recess 24 during the winding will be described below with reference to FIG. 4B. In the flat state of the positive electrode 21 (in the state in which no stress acts on the positive electrode 21), the neutral point is located while shifted toward the side of the second positive electrode active material layer 21C from the center point 21P of the positive electrode 21. On the other hand, in the state in which the positive electrode 21 is wound back, the neutral point moves to the inside of the center point 21P and is located at or near the positive electrode current collector 21A, so that the tensile stress does not acts or hardly acts on the positive electrode current collector 21A. Thus, the generation of the crack and the like is prevented in the positive electrode current collector 21A.

An example of a battery manufacturing method of the embodiment of the present technology will be described below.

The positive electrode 21 is produced as follows. First, for example, a positive electrode mixture is prepared by mixing the positive electrode active material, the conducting agent, and the binding agent, and the positive electrode mixture is dispersed in a solvent such as N-methyl-2-pyrrolidone (NMP) to prepare a pasty positive electrode mixture slurry. Subsequently, the positive electrode mixture slurry is applied to both the surfaces of the positive electrode current collector 21A. At this point, on one surface of the positive electrode current collector 21A, a coating thickness of the portion constituting the second region R2 is thinner than a coating thickness of the portion constituting the first region R1. The coating thickness is preferably adjusted such that the ranges of the preferable area density ratio D2/D1 and the average thickness difference ΔT are obtained. Subsequently, the solvent contained in the coating film is dried, and the first and second positive electrode active material layers 21B, 21C are formed by compression molding using a roll press machine or the like. Consequently, the positive electrode 21 including the first and second regions R1, R2 in the first positive electrode active material layer 21B is produced.

The negative electrode 22 is produced as follows. First, for example, a negative electrode mixture is prepared by mixing the negative electrode active material and the binding agent, and the negative electrode mixture is dispersed in the solvent such as N-methyl-2-pyrrolidone to prepare a pasty negative electrode mixture slurry. Subsequently, the negative electrode mixture slurry is applied to both the surfaces of the negative electrode current collector 22A, the solvent is dried, and the first and second negative electrode active material layers 22B, 22C are formed by compression molding using a roll press machine or the like to prepare the negative electrode 22.

Subsequently, the positive electrode lead 11 is attached to one end of the positive electrode current collector 21A by welding, and the negative electrode lead 12 is attached to one end of the negative electrode current collector 22A by welding. Subsequently, the positive electrode 21 and the negative electrode 22 are wound around the flat winding core with the separator 23 interposed therebetween, and the wound electrode body 20 is produced by winding the positive electrode 21 and the negative electrode 22 many times in the longitudinal direction. At this point, the directions of main surfaces of the positive electrode 21 and the negative electrode 22 are set such that the first positive electrode active material layer 21B and the first negative electrode active material layer are located on the inside surfaces of the positive electrode current collector 21A and the negative electrode current collector 22A, respectively. The winding position of the positive electrode 21 with respect to the flat winding core is adjusted such that the second region R2 is located in the winding-back portion of the first positive electrode active material layer 21B. Subsequently, the end on the outer peripheral side of the negative electrode 22 that is the outermost peripheral electrode is fixed by a winding-stop tape (not illustrated).

Subsequently, for example, the wound electrode body 20 is sandwiched between the flexible exterior members 30, and the outer peripheral edge excluding one side is thermally fused to form a bag shape, and accommodated in the exterior member 30. At this point, the adhesive film 31 is inserted between the positive electrode lead 11 and the negative electrode lead 12 and the exterior member 30. Subsequently, the electrolytic solution is prepared, and injected into the exterior member 30 from one side that is not thermally fused. Subsequently, the above one side is thermally fused in a vacuum atmosphere to seal the wound electrode body 20. Consequently, the battery 10 externally packaged by the exterior member 30 is obtained.

Subsequently, the battery 10 is molded by heat pressing as necessary. More specifically, the battery 10 is heated at a temperature higher than normal temperature while pressurized. Subsequently, as necessary, a pressure plate or the like is pressed against the main surface of the battery 10 to uniaxially pressurize the battery 10.

In the battery 10 of the embodiment, the positive electrode 21 includes the positive electrode current collector 21A and a first positive electrode active material layer 21B provided on the inside surface of the positive electrode current collector 21A. The first positive electrode active material layer 21B includes the first region R1 and the second region R2 having the area density lower than that of the first region R1, and the second region R2 is provided in the winding-back portion of the first positive electrode active material layer 21B. Consequently, the generation of the crack and the like can be prevented in the winding-back portion of the positive electrode 21 at the time of the winding of the positive electrode 21 and after the winding of the positive electrode 21 (for example, at the time of pressing of the battery 10).

In the method for manufacturing the battery of the embodiment, the recess 24 is formed by adjusting the coating thickness of the positive electrode mixture slurry in the coating process. For this reason, the first positive electrode active material layer 21B is prevented from protruding on both sides of the recess 24. On the other hand, in the case that the recess 24 is formed in the pressing process, there is a possibility that the first positive electrode active material layer 21B protrudes on both sides of the recess 24. When the protrusion is generated, there is a possibility that the thickness of the positive electrode 21 is increased to decrease the capacity density of the battery.

In the embodiment, by way of example, the present technology is applied to the laminated film type battery. However, the present technology can be applied to any battery including the wound electrode body including the electrode wound into the flat shape. For example, the present technology can also be applied to a square battery or the like in which a flat wound electrode body is accommodated in a square battery can.

In the embodiment, by way of example, the present technology is applied to the lithium ion secondary battery. However, the present technology can also be applied to a secondary battery other than a lithium ion secondary battery and a primary battery. However, the present technology is particularly effective when applied to the lithium ion secondary battery.

The electrolyte layer may be provided between the positive electrode 21 and the separator 23, and the electrolyte layer may be provided between the negative electrode 22 and the separator 23. These electrolyte layers include an electrolytic solution and a polymer compound serving as a holding body that holds the electrolytic solution, and the polymer compound is swollen by the electrolytic solution. The content ratio of the polymer compound can appropriately be adjusted. In particular, for a gel electrolyte, preferably high ionic conductivity can be obtained and leakage of the battery 10 can be prevented.

The electrolytic solution is similar to the electrolytic solution of the embodiment. Polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate can be cited as an example of the polymer compound. In particular, from the viewpoint of electrochemical stability, polyacrylonitrile, polyvinylidene fluoride, polyhexafluoropropylene, and polyethylene oxide is preferably used as the polymer compound. The inorganic substance similar to that described in the resin layer of the separator 23 of the embodiment may be included in the electrolyte layer. In this case, the heat resistance can further be improved.

The first negative electrode active material layer 22B has the first region and the second region having the area density lower than that of the first region, and the second region may be provided in the winding-back portion of the first negative electrode active material layer 22B while the negative electrode 22 is wound. In this case, the position where the second area is provided, the configuration of the second area, the area density ratio D2/D1 of the average area density D1 of the first area and the average area density D2 of the second area, the average thickness difference $\Delta T$ between the average thickness T1 of the negative electrode 22 in the first region and the average thickness T2 of the negative electrode 22 in the second region, and the like can be similar to those in the positive electrode 21 of the embodiment.

In the embodiment, by way of example, the first positive electrode active material layer 21B in the second region R2 is thinner than the first positive electrode active material layer 21B in the first region R1. Alternatively, the first positive electrode active material layers 21B in the first and second regions R1, R2 may be equal or substantially equal to each other in the thickness, and the first positive electrode active material layers 21B in the first and second regions R1, R2 may be different from each other only in the area density. Also in this case, the generation of the crack and the like can be prevented in the winding-back portion of the positive electrode 21 during the winding and after the winding of the positive electrode 21.

A battery pack and an electronic device each of which includes the battery of the embodiment or the modifications thereof will be described in application example 1.

Figure 5:
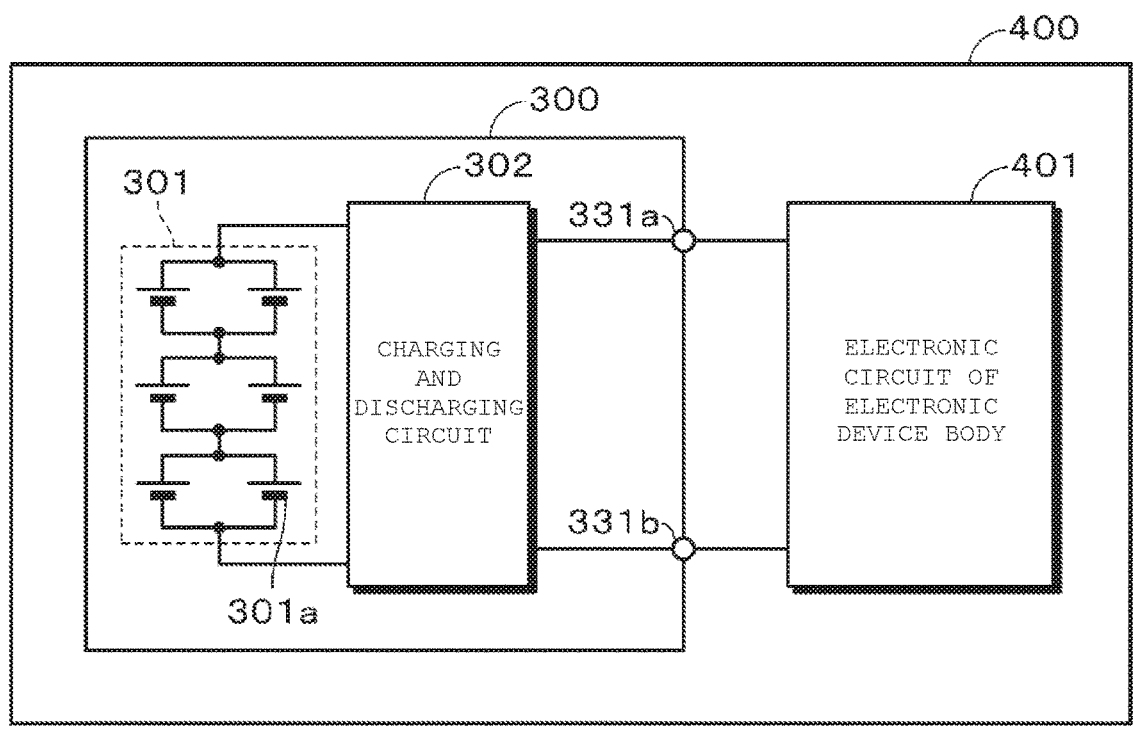
FIG. 5 is a block diagram illustrating an example of a configuration of an electronic device as an application example according to an embodiment of the present technology.

Configuration examples of a battery pack 300 and an electronic device 400 as an application example will be described below with reference to FIG. 5. The electronic device 400 includes an electronic circuit 401 of an electronic device main body and the battery pack 300. The battery pack 300 is electrically connected to the electronic circuit 401 through a positive electrode terminal 331a and a negative electrode terminal 331b. For example, the electronic apparatus 400 has a configuration that allows a user to detachably attach the battery pack 300. The electronic device 400 is not limited to this configuration, but the battery pack 300 may be built in the electronic device 400 such that the user cannot remove the battery pack 300 from the electronic device 400.

In charging the battery pack 300, the positive electrode terminal 331a and the negative electrode terminal 331b of the battery pack 300 are connected to the positive electrode terminal and the negative electrode terminal of a charger (not illustrated), respectively. On the other hand, in discharging the battery pack 300 (during use of the electronic device 400), the positive electrode terminal 331a and the negative electrode terminal 331b of the battery pack 300 are connected to the positive electrode terminal and the negative electrode terminal of the electronic circuit 401, respectively.

Examples of the electronic device 400 include a notebook type personal computer, a tablet type computer, a mobile phone (such as a smart phone), a personal digital assistant (PDA), a display device (such as an LCD, an EL display, and an electronic paper), an imaging device (such as a digital still camera and a digital video camera), an audio device (portable audio player), a game machine, a cordless phone handset, an electronic book, an electronic dictionary, a radio, a headphone, a navigation system, a memory card, a pacemaker, a hearing aid, a power tool, an electric shaver, a refrigerator, an air conditioner, a television, a stereo, a water heater, a microwave oven, a dishwasher, a washing machine, a drier, a lighting device, a toy, a medical device, a robot, a road conditioner, and a traffic signal. However, the electronic device 400 is not limited to these examples.

The electronic circuit 401 includes a CPU, a peripheral logic unit, an interface unit, and a storage unit, and controls the entire electronic device 400.

The battery pack 300 includes an assembled battery 301 and a charging and discharging circuit 302. The assembled battery 301 is configured by connecting a plurality of secondary batteries 301a in series and/or in parallel. The plurality of secondary batteries 301a are connected to, for example, n parallel m series (n, m are positive integers). FIG. 5 illustrates an example in which six secondary batteries 301a are connected in two parallel three series (2P3S). The battery of the embodiment or the modifications is used as the secondary battery 301a.

At this point, the battery pack 300 includes the assembled battery 301 constructed with the plurality of secondary batteries 301a. However, the battery pack 300 may include one secondary battery 301a instead of the assembled battery 301.

The charging and discharging circuit 302 is a controller that controls the charging and the discharging of the assembled battery 301. Specifically, at the time of the charging, the charging and discharging circuit 302 controls the charging of the assembled battery 301. On the other hand, at the time of the discharging (that is, during use of the electronic device 400), the charging and discharging circuit 302 controls the discharging of the electronic device 400.

Figure 6:
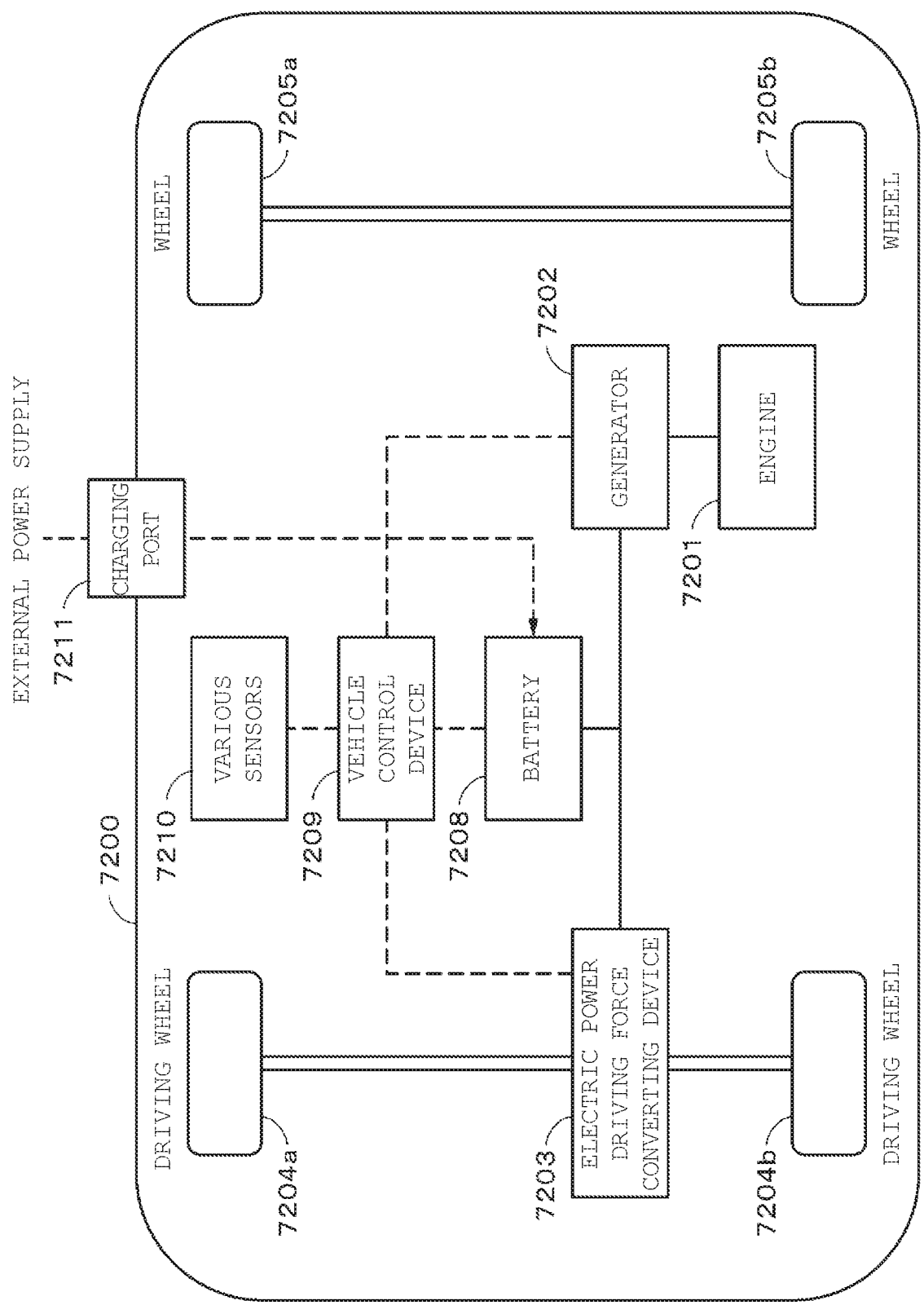
FIG. 6 is a schematic diagram illustrating an example of a configuration of an electric storage system in a vehicle as an application example according to an embodiment of the present technology.

An example in which the present disclosure is applied to an electric storage system for a vehicle will be described with reference to FIG. 6. FIG. 6 schematically illustrates an example of a configuration of a hybrid vehicle in which a series hybrid system, to which the present disclosure is applied, is used. The series hybrid system is a vehicle that travels by a power driving force converting device using electric power generated by a generator driven by an engine or electric power temporarily stored in a battery.

A hybrid vehicle 7200 includes an engine 7201, a generator 7202, an electric power driving force converting device 7203, a driving wheel 7204a, a driving wheel 7204b, a wheel 7205a, a wheel 7205b, a battery 7208, a vehicle control device 7209, various sensors 7210, a charging port 7211. The electric storage device of the present disclosure is applied to the battery 7208.

The hybrid vehicle 7200 travels with the electric power driving force converting device 7203 as a power source. An example of the electric power driving force converting device 7203 is a motor. The electric power driving force converting device 7203 is activated by the electric power of the battery 7208, and rotation force of the electric power driving force converting device 7203 is transmitted to the driving wheels 7204a, 7204b. Using DC-AC or AC-DC conversion at a necessary place, the electric power driving force converting device 7203 can be applied to either an AC motor or a DC motor. The various sensors 7210 control the engine speed through the vehicle control device 7209, and control an opening degree (throttle opening degree) of a throttle valve (not illustrated). The various sensors 7210 include a speed sensor, an acceleration sensor, and an engine speed sensor.

The rotation force of the engine 7201 is transmitted to the generator 7202, and the electric power generated by the rotation force using the generator 7202 can be stored in the battery 7208.

When the hybrid vehicle decelerates by a braking mechanism (not illustrated), decelerating resistance force is added to the electric power driving force converting device 7203 as the rotation force, and regenerative electric power generated by the rotation force using the electric power driving force converting device 7203 is stored in the battery 7208.

When the battery 7208 is connected to a power supply outside the hybrid vehicle, the battery 7208 can receive supply of the electric power from the external power supply with a charging port 211 as an input port, and store the received electric power.

Although not illustrated, the hybrid vehicle 7200 may include an information processing device that performs information processing relating to vehicle control based on information about the secondary battery. An information processing device that displays a remaining battery level based on information about the remaining amount of the battery can be cited as an example of the information processing device.

By way of example, the series hybrid car travels by the motor using the electric power generated by the generator driven by the engine, or the electric power temporarily stored in the battery. However, the present disclosure is also effective for a parallel hybrid vehicle, in which outputs of both the engine and the motor are used as the driving source and three schemes of traveling with only the engine, traveling only with the motor, and traveling with the engine and the motor are appropriately switched. The present disclosure can also be effectively applied to what is called an electrically driven vehicle that travels only by a drive motor with no use of the engine.

The hybrid vehicle 7200 to which the technique of the present disclosure can be applied is described by way of example. The technology of the present disclosure can suitably be applied to the battery 7208 among the above configurations.

Figure 7:
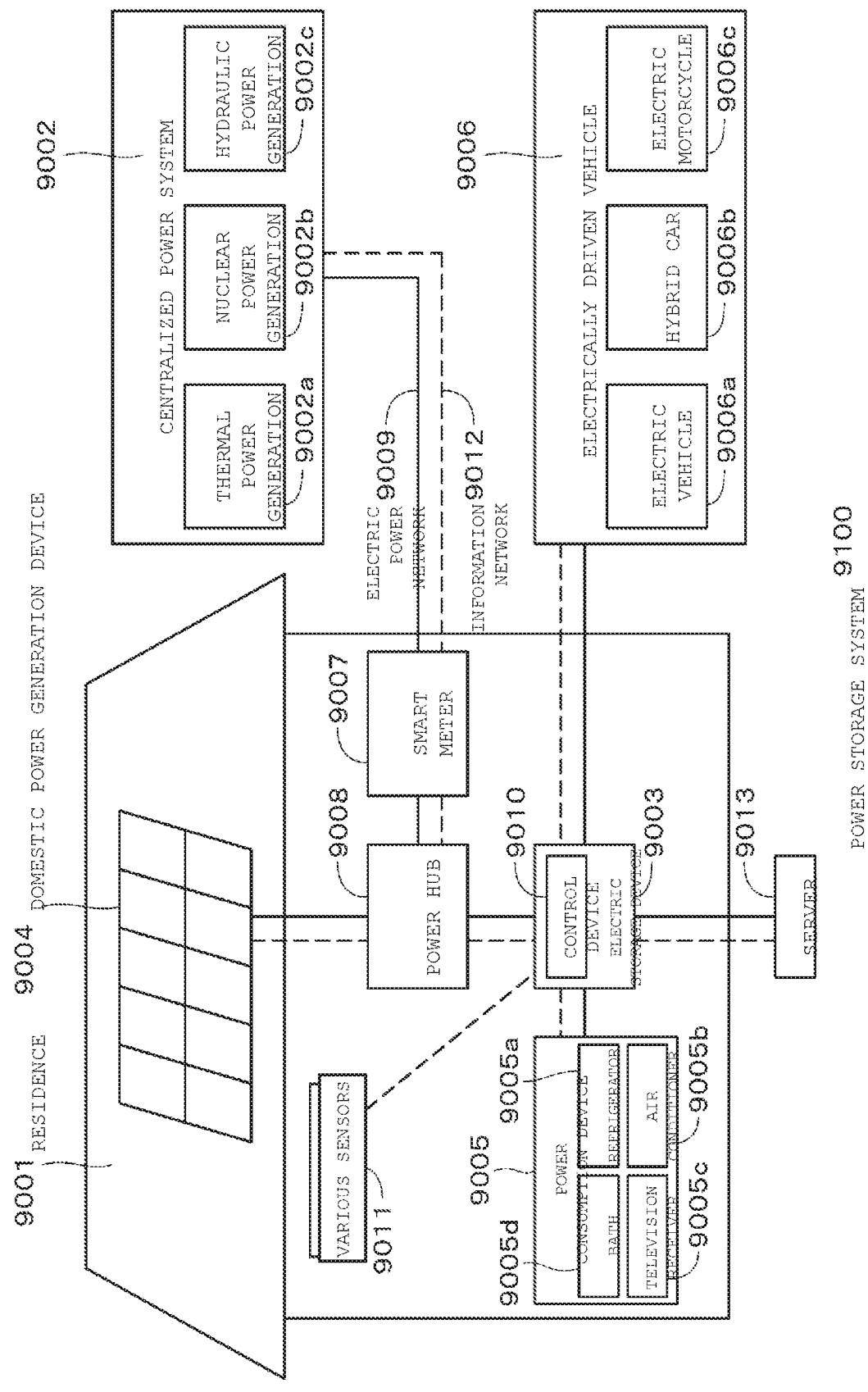
FIG. 7 is a schematic diagram illustrating an example of a configuration of the electric storage system in a residence as an application example according to an embodiment of the present technology.

An example in which the present disclosure is applied to an electric storage system for a residence will be described with reference to FIG. 7. For example, in an electric storage system 9100 for a residence 9001, the electric power is supplied from a centralized power system 9002 such as a thermal power generation 9002a, a nuclear power generation 9002b, and a hydraulic power generation 9002c to an electric storage device 9003 through an electric power network 9009, an information network 9012, a smart meter 9007, and power hub 9008. At the same time, the electric power is supplied from an independent power source such as a domestic power generation device 9004 to the electric storage device 9003. The electric power supplied to the electric storage device 9003 is stored. The electric power to be used in the residence 9001 is supplied using the electric storage device 9003. A similar power storage system can be used for a building as well as the residence 9001.

A power generation device 9004, a power consumption device 9005, the electric storage device 9003, a control device 9010 that controls each device, the smart meter 9007, and a sensor 9011 that acquires various pieces of information are provided in the residence 9001. Each device is connected by the power network 9009 and the information network 9012. A solar cell, a fuel cell, or the like is used as the power generation device 9004, and the generated electric power is supplied to the power consumption device 9005 and/or the electric storage device 9003. For example, the power consumption device 9005 is a refrigerator 9005a, an air conditioner 9005b, a television receiver 9005c, and a bath 9005d. The electric power consumption device 9005 includes an electrically driven vehicle 9006. The electrically driven vehicle 9006 is an electric vehicle 9006a, a hybrid car 9006b, and an electric motorcycle 9006c.

The battery unit of the present disclosure is applied to the electric storage device 9003. The electric storage device 9003 is constructed with a secondary battery or a capacitor. For example, the electric storage device 9003 is constructed with a lithium ion battery. The lithium ion battery may be stationary or be used in the electrically driven vehicle 9006.

The smart meter 9007 has a function of measuring the usage amount of commercial power and sending the measured usage amount to an electric power company. In the electric power network 9009, any one or a combination of DC power feed, AC power feed, and contactless power feed may be used.

Examples of the various sensors 9011 include a human sensor, an illuminance sensor, an object detection sensor, a power consumption sensor, a vibration sensor, a contact sensor, a temperature sensor, and an infrared sensor. The information acquired by the various sensors 9011 is transmitted to the control device 9010. Based on the information from the sensor 9011, the state of the weather, the state of the person, and the like are grasped and the power consumption device 9005 is automatically controlled to minimize energy consumption. The control device 9010 can transmit information about the residence 9001 to an external electric power company or the like through the Internet.

The power hub 9008 performs processes such as branching of a power line and DC/AC conversion. Examples of a communication system of the information network 9012 connected to the control device 9010 include a method using a communication interface such as universal asynchronous receiver-transmitter (UART) and a method using a sensor network pursuant to a wireless communication standard such as Bluetooth (registered trademark), ZigBee (registered trademark), and Wi-Fi. The Bluetooth (registered trademark) system is applied to multimedia communication, and can conduct one-to-many connection communication. ZigBee (registered trademark) uses a physical layer of Institute of Electrical and Electronics Engineers (IEEE) 802.15.4. IEEE 802.15.4 is a name of a short-range wireless network standard called personal area network (PAN) or W (Wireless) PAN.

The control device 9010 is connected to an external server 9013. The server 9013 may be managed by any of the residence 9001, the electric power company, and a service provider. Examples of the information transmitted and received by the server 9013 include power consumption information, life pattern information, an electric charge, weather information, natural disaster information, and information about electricity transaction. These pieces of information may be transmitted and received from a power consuming device (for example, a television receiver) in a home, or transmitted and received from a device outside the home (for example, a mobile phone). These pieces of information may be displayed on a device, such as a television receiver, a mobile phone, and personal digital assistant (PDA), which has a display function.

The control device 9010 that controls each unit is constructed with a central processing unit (CPU), a random access memory (RAM), and a read only memory (ROM). In this example, the control device 9010 is accommodated in the electric storage device 9003. The control device 9010 is connected to the electric storage device 9003, the domestic power generation device 9004, the power consumption device 9005, the various sensors 9011, and the server 9013 through the information network 9012. For example, the control device 9010 has a function of adjusting a usage amount of the commercial power and a power generation amount. Additionally, the control device 9010 may have a function of performing the electricity transaction in an electric power market.

As described above, the electric power generated by not only the centralized power system 9002 such as the thermal power generation 9002a, the nuclear power generation 9002b, and the hydraulic power generation 9002c but also the domestic power generation device 9004 (solar power generation, wind power generation) can be stored in the electric storage device 9003. Thus, even if the electric power generated by the domestic power generation device 9004 fluctuates, control can be performed such that the amount of electric power sent to the outside is kept constant or discharged as much as necessary. For example, the electric power obtained by photovoltaic power generation is stored in the electric storage device 9003, midnight power in which the charge is cheap is stored in the electric storage device 9003 at night time, and the power stored by the electric storage device 9003 is discharged in a time period in which the daytime charge is high.

In this example, the control device 9010 is accommodated in the electric storage device 9003. Alternatively, the control device 9010 may be accommodated in the smart meter 9007, or configured singly. The electric storage system 9100 may be used for a plurality of homes in a condominium, or used for a plurality of detached residences.

An example of the electric storage system 9100 to which the technology of the present disclosure can be applied is described above. The technology of the present disclosure can suitably be applied to the secondary battery included in the electric storage device 9003 among the configurations described above.

Hereinafter, the present technology will specifically be described with reference to examples, but the present technology is not limited only to these examples.

In the examples, the average area densities D1, D2, the area density ratio D2/D1, the average thicknesses T1, T2, the average thickness difference $\Delta T$ ($=T1-T2$), and the width W are values obtained by the measuring method described in the embodiment.

Examples 1 to 8

The positive electrode was prepared as follows. First, lithium carbonate ($Li_2CO_3$) and cobalt carbonate ($CoCO_3$) were mixed at a molar ratio of 0.5:1, and fired in air at 900° C. for 5 hours to obtain a lithium cobalt composite oxide ($LiCoO_2$) as the positive electrode active material. Subsequently, 91 parts by mass of the lithium cobalt composite oxide obtained as described above, 6 parts by mass of graphite as the conducting agent and 3 parts by mass of polyvinylidene fluoride as the binding agent were mixed to form a positive electrode mixture, and dispersed in N-methyl-2-pyrrolidone to prepare the pasty positive electrode mixture slurry.

Subsequently, the positive electrode mixture slurry was coated on both the sides of the positive electrode current collector constructed with a belt-shaped aluminum foil (12 μm thick), and dried. At this point, the coating thicknesses of the low area density region (the second region R2) and the normal area density region (the first region R1) except for the low area density region were adjusted such that the average area densities of the low area density region of the first positive electrode active material layer and the normal area density region were set to the values in Table 1. Then, the positive electrode current collector having the dried positive electrode mixture on both the sides was compression-molded by the roll pressing machine such that the thickness of the first positive electrode active material layer in the area density region became the value in Table 1, whereby the first and second positive electrode active material layers were formed to obtain the positive electrode, and the positive electrode was slit into a predetermined width. Consequently, the intended positive electrode was obtained.

Comparative Example 1

The positive electrode mixture slurry was uniformly applied to the positive electrode current collector such that the entire first positive electrode active material layer became the normal area density region (first region R1) having the average area density in Table 1. The positive electrode current collector having the dried positive electrode mixture on both the sides was compression-molded by the roll pressing machine such that the thickness of the first positive electrode active material layer became the value in Table 1. The positive electrode was obtained in the manner similar to that of Example 1 except for this.

Using the positive electrodes of Examples 1 to 8 and Comparative example 1 obtained as described above, the following two tests were performed to evaluate damage resistance of the winding-back portion (curved portion) when the wound electrode body was formed.

The tests were performed in the following procedure using the positive electrodes of Examples 1 to 8 including the low areal density region. First, the belt-shaped positive electrodes of Examples 1 to 8 were cut into a rectangular shape of 1.5 cm×5.5 cm such that the low area density region of the first positive electrode active material layer was located at the center, and a test sample was prepared. Subsequently, the prepared test sample was immersed in the solvent for 30 minutes, wiped off with a waste cloth, and naturally dried for about 2 to 10 minutes. A mixed solvent in which ethylene carbonate (EC) and propylene carbonate (PC) were mixed in a mass ratio of EC:PC=1:1 was used as the solvent.

Figure 8:
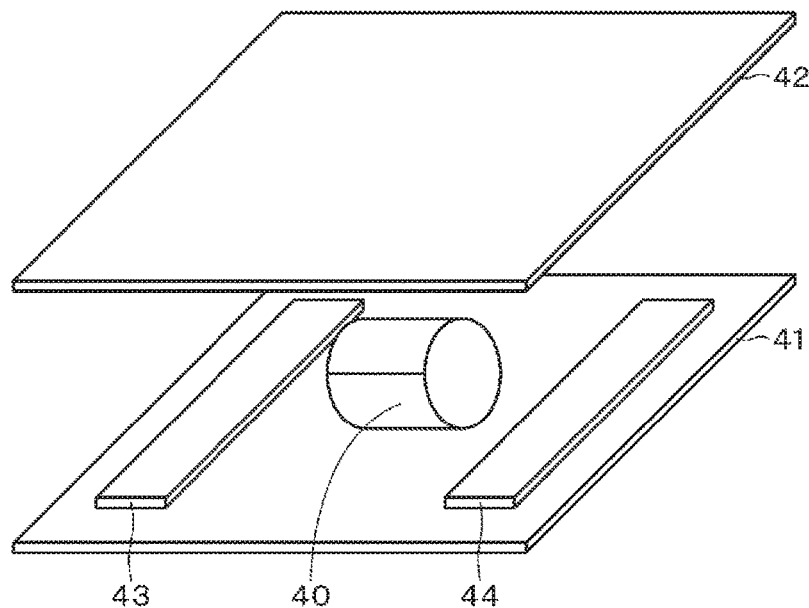
FIG. 8 is a perspective view illustrating a configuration of an instrument used to evaluate a breakage gap according to an embodiment of the present technology.

Subsequently, a test was performed as follows using an instrument in FIG. 8. First, two glass plates 41, 42 were sandwiched such that the low area density region became the inside and such that the test sample 40 is wound back in the low area density region, and the roller was pressed onto the glass plate 42. At this point, a gap between the two glass plates 41, 42 was set to a predetermined value according to the thicknesses of shims 43, 44. Then, whether the crack and the like are generated in the winding-back portion of the test sample 40 was visually checked. This test was repeated by changing the gap between the glass plates 41, 42 (that is, the thicknesses of the shims 43, 44), and the gap where the crack and the like are generated in the winding-back portion of the test sample 40 was obtained. The results are illustrated in Table 1 and FIG. 9. In Table 1 and FIG. 9, a "breakage gap" means a gap where the crack and the like are generated.

For the positive electrode of Comparative example 1 which does not include the low area density region, the test was performed in the procedure similar to Examples 1 to 8 except that the belt-shaped positive electrode was cut into the rectangular shape of 1.5 cm×5.5 cm at any position, and the gap where the crack and the like were generated in the winding-back portion of the test sample 40 was obtained.

Ten positive electrodes of each of Examples 1 to 8 and ten positive electrodes of Comparative example 1 were prepared, and the test was performed in the following procedure. First, the negative electrode in which the first negative electrode active material layer and the second negative electrode active material layer were formed on both the surfaces of the negative electrode current collector, respectively was prepared. Subsequently, the positive electrode of each of Examples 1 to 8 and Comparative example 1 and the prepared negative electrode were wound around the flat winding core with the separator constructed with the porous polyethylene film having a thickness of 12 μm interposed therebetween, and wound in the longitudinal direction, and the wound electrode body having the flat shape was produced by attaching a winding-stop tape to the outermost periphery. Subsequently, the wound electrode body was impregnated with an electrolytic solution, the wound electrode body was disassembled after 30 minutes from impregnation, and the positive electrode was taken out. The positive electrode was wiped with a waste cloth and naturally dried for about 2 to 10 minutes, whether the crack and the like were generated in the winding-back portion of the positive electrode was visually checked, and the number of positive electrodes in which the crack and the like occurred among the 10 positive electrodes having the same configuration was counted. Table 1 illustrates the result.

Table 1 illustrates the structures and evaluation results of the positive electrodes of Examples 1 to 8 and Comparative example 1.

TABLE 1

|  | Positive electrode | | | | | | | Test 1 | Test 2 |
| --- | --- | --- | --- | --- | --- | --- | --- | --- | --- |
|  | D1 [mg/cm$^2$] | D2 [mg/cm$^2$] | D2/D1 [—] | T1 [μm] | T2 [μm] | ΔT (T1 − T2) [μm] | W [mm] | Break gap [μm] | The number of breakages |
| Example 1 | 16.5 | 15.5 | 0.94 | 93.1 | 88.4 | 4.7 | 18 | 2600 | 6/10 |
| Example 2 | 16.5 | 14.5 | 0.88 | 93.3 | 86.9 | 6.4 | 19 | 1700 | 5/10 |
| Example 3 | 16.5 | 13.5 | 0.82 | 93 | 85.4 | 7.6 | 18 | 1200 | 4/10 |
| Example 4 | 16.5 | 9 | 0.55 | 93.3 | 79.5 | 13.8 | 18.5 | 900 | 0/10 |
| Example 5 | 16.5 | 4 | 0.24 | 93.2 | 71.1 | 22.1 | 18.5 | 300 | 0/10 |
| Example 6 | 18 | 13.5 | 0.75 | 99.3 | 89.9 | 9.4 | 18.5 | 900 | 0/10 |
| Example 7 | 19 | 13.5 | 0.71 | 104.1 | 94.8 | 9.3 | 19 | 900 | 0/10 |
| Example 8 | 20 | 14.5 | 0.73 | 109.9 | 100.1 | 9.8 | 17.5 | 1000 | 0/10 |
| Comparative example 1 | 16.5 | — | 1.00 | 92.9 | 92.9 | 0 | 19 | 3400 | 10/10 |

Figure 9:
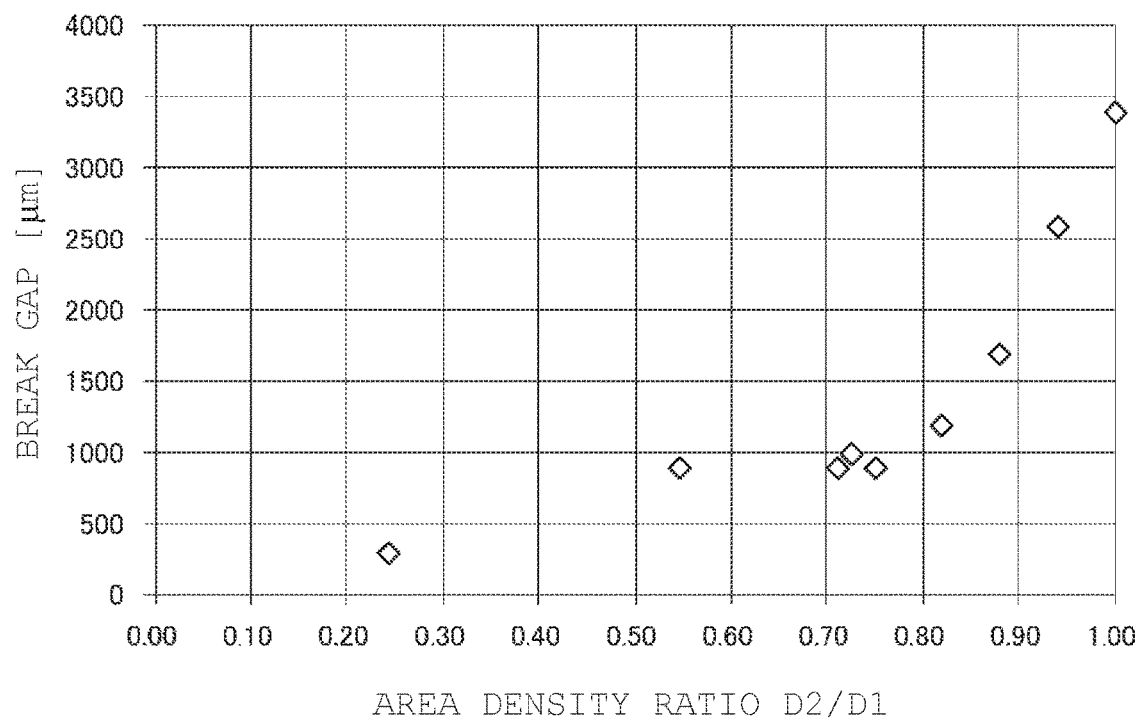
FIG. 9 is a graph illustrating a relationship between an area density ratio and the breakage gap according to an embodiment of the present technology.

D1: average area density in normal area density region (first region R1)
D2: average area density in low-area density region (second region R2)
D2/D1: area density ratio
T1: average thickness of positive electrode in normal area density region (first region R1)
T2: average thickness of positive electrode in low area density region (second region R2)
ΔT (= T1 − T2): average thickness difference of positive electrode
W: width of low area density region (second region R2) in the longitudinal direction of positive electrode The following can be seen from the result of Test 1 (Table 1, FIG. 9). The area density ratio D2/D1 of the average areal density D1 in the normal area density region and the average areal density D2 in the low area density region is set less than 1, namely, the low area density region is provided at the winding-back portion of the first positive electrode active material layer, whereby the gap where the crack and the like are generated in the positive electrode can further be narrowed. The gap where the crack and the like are generated in the positive electrode can be narrowed with decreasing area density ratio D2/D1. When the area density ratio D2/D1 is set less than or equal to 0.8, the break gap can particularly be narrowed.

The following can be seen from the results of Test 2 (Table 1). By providing the low area density region in the first winding-back portion of the first positive electrode active material layer, the generation of the crack and the like can be prevented in the first winding-back portion of the positive electrode even if the wound electrode body is actually prepared. When the area density ratio D2/D1 is set less than or equal to 0.9, the number of generation times of the crack and the like can further be decreased. When the area density ratio D2/D1 is set less than or equal to 0.8, the number of generation times of the crack and the like becomes zero, and the effect that prevents the generation of the crack and the like is particularly markedly exhibited.

Although the embodiment and the modifications of the present technology are specifically described above, the present technology is not limited to the above embodiment, the modifications, and Examples, and various changes can be made based on technical idea of the present technology.

For example, the configurations, methods, processes, shapes, materials, numerical values, and the like cited in the embodiments, the modifications, and Examples are merely examples, and different configurations, methods, steps, shapes, materials and numerical values may be used as necessary.

Further, the configurations, methods, processes, shapes, materials, numerical values, and the like of the embodiments, the modifications, and Examples can be combined with each other as long as they do not deviate from the gist of the present technology.

The present technology is described below in further detail according to an embodiment.

(1)

A battery includes a belt-shaped electrode wound into a flat shape. The electrode includes a current collector and an active material layer provided on an inside surface of the current collector, the active material layer includes a first region and a second region having an area density lower than that of the first region, and the second region is provided in a winding-back portion of the active material layer.

(2)

In the battery according to (1), a thickness of the active material layer in the second region is thinner than a thickness of the active material layer in the first region.

(3)

In the battery according to (1) or (2), the winding-back portion in which the second region is provided is a first winding-back portion of an innermost periphery of the active material layer.

(4)

In the battery according to (1) or (2), the winding-back portion includes a first winding-back portion on a first side of an innermost periphery of the active material layer, and a second winding-back portion on a second side of the innermost periphery of the active material layer.

(5)

In the battery according to (1) or (2), the winding-back portion in which the second region is provided is winding-back portions of first and second turns of the active material layer.

(6)

In the battery according to any one of (1) to (5), an area density ratio D2/D1 of an average area density D1 of the active material layer in the first region and an average area density D2 of the active material layer in the second region satisfies a relationship of 0<D2/D1≤0.9.

(7)

In the battery according to any one of (1) to (6), a width of the second region in a longitudinal direction of the electrode ranges from 1 mm to 20 mm.

(8)

In the battery according to any one of (1) to (7), a width of the second region in a longitudinal direction of the electrode ranges from 5 mm to 20 mm.

(9)

In the battery according to any one of (1) to (8), the electrode is a positive electrode.

(10)

In the battery according to (9), the current collector contains aluminum or an aluminum alloy, and a thickness of the current collector ranges from 8 μm to 15 μm.

(11)

In the battery according to (9) or (10), an average area density of the active material layer in the first region R1 is greater than or equal to 12.5 mg/cm$^2$.

(12)

In the battery according to any one of (1) to (11), the second region is a recess having a bottom surface.

(13)

In the battery according to any one of (1) to (11), the second region is a recess, and the recess is open while the positive electrode is wound.

(14)

A battery pack includes: the battery according to any one of (1) to (13); and a controller that controls the battery.

(15)

An electronic device includes the battery according to any one of (1) to (13). Power is supplied from the battery to the electronic device.

(16)

An electrically driven vehicle includes: the battery according to any one of (1) to (13); a converter that receives supply of power from the battery to convert the power into driving force of a vehicle; and a control device that performs information processing relating to vehicle control based on information about the battery.

(17)

An electric storage device includes the battery according to any one of (1) to (13). The electric storage device supplies power to an electronic device connected to the battery.

(18)

An electric power system includes the battery according to any one of (1) to (13). The electric power system receives supply of power from the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery comprising an electrode,
wherein
the electrode includes a current collector and an active material layer provided on an inside surface of the current collector,
the active material layer includes a first region and a second region, wherein the second region includes an area density lower than the first region, and
the second region is provided in a winding-back portion of the active material layer; and
wherein the second region includes a recess having a bottom surface.

2. The battery according to claim 1, wherein a thickness of the active material layer in the second region is thinner than a thickness of the active material layer in the first region.

3. The battery according to claim 1, wherein the winding-back portion includes a first winding-back portion of an innermost periphery of the active material layer.

4. The battery according to claim 1, wherein the winding-back portion includes a first winding-back portion on a first side of an innermost periphery of the active material layer, and a second winding-back portion on a second side of the innermost periphery of the active material layer.

5. The battery according to claim 1, wherein the winding-back portion includes winding-back portions of first and second turns of the active material layer.

6. The battery according to claim 1, wherein an area density ratio D2/D1 of an average area density D2 of the active material layer in the second region to an average area density D1 of the active material layer in the first region satisfies a relationship of 0<D2/D1≤0.9.

7. The battery according to claim 1, wherein a width of the second region in a longitudinal direction of the electrode ranges from 1 mm to 20 mm.

8. The battery according to claim 1, wherein a width of the second region in a longitudinal direction of the electrode ranges from 5 mm to 20 mm.

9. The battery according to claim 1, wherein the electrode includes a positive electrode.

10. The battery according to claim 9, wherein
the current collector includes aluminum or aluminum alloy, and
a thickness of the current collector ranges from 8 µm to 15 µm.

11. The battery according to claim 9, wherein an average area density of the active material layer in the first region is greater than or equal to 12.5 mg/cm$^2$.

12. The battery according to claim 1, wherein
the second region includes a recess, and
the recess is open while the electrode is wound.

13. A battery pack comprising:
the battery according to claim 1; and
a controller configured to control the battery.

14. An electronic device comprising the battery according to claim 1, wherein power is configured to be supplied from the battery to the electronic device.

15. An electric vehicle comprising:
the battery according to claim 1;
a converter is configured to receive power from the battery to convert the power into driving force of the electric vehicle; and
a control device is configured to perform information processing relating to vehicle control based on information about the battery.

16. An electric storage device comprising the battery according to claim 1, wherein the electric storage device is configured to supply power to an electronic device connected to the battery.

17. An electric power system comprising the battery according to claim 1, wherein the electric power system is configured to receive supply of power from the battery.

18. The battery according to claim 1, wherein the electrode includes a flat shape electrode configured to be wound from a belt-shaped electrode.

* * * * *